(12) United States Patent
Sun

(10) Patent No.: US 9,198,029 B2
(45) Date of Patent: Nov. 24, 2015

(54) SERVICE PROCESSING METHOD AND DEVICE FOR UBIQUITOUS UE

(75) Inventor: Aifang Sun, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 48 days.

(21) Appl. No.: 14/232,608

(22) PCT Filed: Apr. 19, 2012

(86) PCT No.: PCT/CN2012/074402
§ 371 (c)(1),
(2), (4) Date: Jan. 13, 2014

(87) PCT Pub. No.: WO2012/155758
PCT Pub. Date: Nov. 22, 2012

(65) Prior Publication Data
US 2014/0177529 A1 Jun. 26, 2014

(30) Foreign Application Priority Data

Aug. 9, 2011 (CN) .......................... 2011 1 0226888

(51) Int. Cl.
*H04W 8/22* (2009.01)
*H04W 4/04* (2009.01)
(Continued)

(52) U.S. Cl.
CPC ............... *H04W 8/22* (2013.01); *H04W 4/043* (2013.01); *H04W 4/18* (2013.01); *H04W 88/06* (2013.01)

(58) Field of Classification Search
CPC .................................. H04W 8/22; H04W 88/06
See application file for complete search history.

(56) References Cited

U.S. PATENT DOCUMENTS

2002/0061741 A1* 5/2002 Leung et al. .................. 455/414
2004/0097267 A1* 5/2004 Pecen et al. .................. 455/560

(Continued)

FOREIGN PATENT DOCUMENTS

CN 1805355 A 7/2006
CN 101895468 A 11/2010

OTHER PUBLICATIONS

International Search Report in international application No. PCT/CN2012/074402 mailed on Jul. 26, 2012.

(Continued)

*Primary Examiner* — Albert T Chou
(74) *Attorney, Agent, or Firm* — Oppedahl Patent Law Firm LLC

(57) ABSTRACT

The disclosure discloses a service processing device for a ubiquitous User Equipment (UE). The device is a UE middleware embedded in the ubiquitous UE, and includes: a data transferring module, configured to perform data interaction with a ubiquitous node (U-node) via a protocol layer for U-node network connectivity and a protocol layer for wide-area connectivity; an interaction-frame module, configured to provide a capability to select from and convert between different communication-interaction models for data interaction between a functioning module and the U-node via the data transfer module; and the functioning module, configured to determine a UE capability required by a service, determine required U-nodes in a peripheral network environment, aggregate the required U-nodes into a virtual UE, integrate service data, and present the integrated data to a user. The disclosure further discloses a service processing method for a ubiquitous UE. With the solution of the disclosure, a ubiquitous UE in a ubiquitous network is allowed to acquire context information in time, thereby achieving optimized resource utilization and adaptation to a dynamically changing environment.

10 Claims, 2 Drawing Sheets

(51) Int. Cl.
*H04W 4/18* (2009.01)
*H04W 88/06* (2009.01)

(56) References Cited

U.S. PATENT DOCUMENTS

| | | | |
|---|---|---|---|
| 2008/0025243 A1* | 1/2008 | Corneille et al. | 370/313 |
| 2008/0294767 A1 | 11/2008 | Hwang | |
| 2009/0036111 A1* | 2/2009 | Danford et al. | 455/419 |
| 2011/0289186 A1* | 11/2011 | Bell et al. | 709/217 |
| 2015/0133094 A1* | 5/2015 | Lindenman et al. | 455/414.1 |

OTHER PUBLICATIONS

English Translation of the Written Opinion of the International Search Authority in international application No. PCT/CN2012/074402 , Jul. 26, 2012.

A User-Centered Approach for Ubiquitous Service Evaluation: An Evaluation Metrics Focused on Human-System Interaction Capability Jul. 6, 2008.

A context-aware content-provision service based on a ubiquitous service-oriented network framework Jan. 31, 2005.

Dynamic Integration of Ubiquitous Robotic Systems through Capability Model Processing Oct. 1, 2006.

A Ubiquitous and Cooperative Service Framework for network Robot System Dec. 16, 2009.

Draft new F.USN-MW a Service description and requirements for ubiquitous sensor network middlewarea Nov. 12, 2009.

Supplementary European Search Report in European application No. 12785570.8, mailed on Mar. 25, 2015.

\* cited by examiner

SERVICE PROCESSING METHOD AND DEVICE FOR UBIQUITOUS UE

TECHNICAL FIELD

The disclosure relates to the field of wireless communication technique, and in particular to a service processing method and device for a User Equipment (UE).

BACKGROUND

With the continuous development of and research on the ubiquitous network, features such as merging multiple heterogeneous networks, diversified services and peripheral network equipments under a ubiquitous-network architecture become increasingly prominent. In such a network environment, with the continuous expansion and implementation of ubiquitous networks, an increasingly outstanding problem is how to make the most of a peripheral UE around a user to provide the user with fast and outstanding services and achieve the best user experience.

At present, to meet a service request of a user, point-to-point service transfer with the user is accomplished generally using a single-network single-traffic service mode; in an alternative mode, a sensing network or other personal area network (PAN) is adopted to collect data via a local gateway, and then the point-to-point service transfer with the user is further accomplished using the single-network single-traffic service mode. Both modes can meet the requirement of the user in the case that the service demand of the user is small and there are only a single peripheral UE and a single peripheral network around the user. However, for a ubiquitous network formed by merging multiple heterogeneous networks, when facing service demands of multiple users, multiple peripheral networks, and multiple peripheral UEs, adoption of these two modes not only will take up a large bandwidth and lead to a network jam, but will also affect the duration in responding a service request by a user depending on the network load; and failure to respond will occur possibly due to access of a same service by multiple users, which will further affect the Quality of Service (QoS) of the network seriously.

SUMMARY

In view of this, it is desired that an embodiment of the disclosure provides a service processing method and device for a ubiquitous UE, capable of optimizing resource utilization and adaptation to a dynamically changing environment in a ubiquitous network.

To this end, a technical solution of the disclosure is implemented as follows.

The disclosure provides a service processing device for a ubiquitous User Equipment (UE), the device being a UE middleware embedded in the ubiquitous UE, the UE middleware including a data transferring module and a functioning module, wherein the data transferring module is configured to perform data interaction with a ubiquitous node (U-node) via a protocol layer for U-node network connectivity and a protocol layer for wide-area connectivity; and the functioning module is configured to: determine a UE capability required by a service by analyzing a service request; determine required U-nodes in a peripheral network environment according to the UE capability required by the service; aggregate the required U-nodes into a virtual UE; integrate service data provided by the virtual UE, and present the integrated data to a user via a service component.

According to an embodiment, the device may further include an interaction-frame module configured to mask different communication modes and messages of various U-nodes, and provide a capability to select from and convert between different communication-interaction models for data interaction between the functioning module and the U-node via the data transfer module.

According to an embodiment, the functioning module may include a service-demand processing unit, a resource discovering unit, a context acquiring-and-processing unit, an aggregation controlling unit, a configuration managing unit, and a distributed-information processing unit, wherein the service-demand processing unit is configured to: analyze the service request to obtain user preference and context information corresponding to information on the service, send the user preference and context information to the context acquiring-and-processing unit, integrate merged service data, and send the integrated service data to the service component to present the integrated service data to the user;

the context acquiring-and-processing unit is configured to acquire the context information of a U-node in the peripheral network environment, determine the UE capability required by the service according to the user preference and context information acquired by the service-demand processing unit, and send the UE capability required by the service to the resource discovering unit;

the resource discovering unit is configured to: when a ubiquitous UE containing the UE middleware does not have the UE capability required by the service, determine the required U-nodes in the peripheral network environment according to the UE capability required by the service and the context information of a U-node in the peripheral network environment, and notify the aggregation controlling unit of the required U-nodes;

the aggregation controlling unit is configured to aggregate the required U-nodes into the virtual UE;

the configuration managing unit is configured to provide an interface required to configure the virtual UE for the user; and the distributed-information processing unit is configured to merge the service data provided by the virtual UE, and send the merged service data to the service-demand processing unit.

According to an embodiment, the aggregation controlling unit may be specifically configured to aggregate the required U-nodes into the virtual UE according to an aggregation policy for service aggregation with an optimal configuration.

According to an embodiment, the resource discovering unit may be further configured to: when the ubiquitous UE containing the UE middleware has the UE capability required by the service, directly notify the ubiquitous UE containing the UE middleware to provide the service data.

According to an embodiment, the functioning module may further include an initializing unit, a safety-privacy managing unit, an event notifying unit, a reconstruction controlling unit, and an information-policy-library unit, wherein the initializing unit is configured to install and activate data exchanging and interacting functions of each unit;

the safety-privacy managing unit is configured to: perform authentication for user access according to information on the user in the service request, and when the user is authorized to access the requested service, send the service request to the service-demand processing unit;

the event notifying unit is configured to: when the state of a ubiquitous UE in the peripheral network environment changes, notify the context acquiring-and-processing unit to update the context information of a U-node in the peripheral network environment;

the reconstruction controlling unit is configured to reconstruct the aggregated virtual UE according to the context information of a U-node in the peripheral network environment updated by the context acquiring-and-processing unit; and the information-policy-library unit is configured to provide aggregation policy information and the user preference and context information corresponding to the information on the service.

According to an embodiment, the reconstruction controlling unit may be specifically configured to incorporate a suitable replacing U-node and a reconfigured U-node into the aggregated virtual UE according to the updated context information of a U-node in the peripheral network environment to implement seamless service providing and adaptation to the environment.

According to an embodiment, the service component may include input and output equipments.

The disclosure provides a service processing method for a ubiquitous User Equipment (UE), including:

embedding a UE middleware in the ubiquitous UE;

performing, by the UE middleware, data interaction with a ubiquitous node (U-node) via a protocol layer for U-node network connectivity and a protocol layer for wide-area connectivity;

determining, by the UE middleware, a UE capability required by a service by analyzing a service request; determining required U-nodes in a peripheral network environment according to the UE capability required by the service; and aggregating the required U-nodes into a virtual UE; and integrating, by the UE middleware, service data provided by the virtual UE, and presenting the integrated data to a user via a service component.

According to an embodiment, the method may further include: when the UE middleware receives the service request, performing, by the UE middleware, authentication for user access according to information on the user in the service request, and when the user is authorized, allowing the user to access the requested service.

According to an embodiment, the method may further include: when the state of a ubiquitous UE in the peripheral network environment changes, reconstructing, by the UE middleware, the aggregated virtual UE according to updated context information of a U-node in the peripheral network environment.

The disclosure provides a service processing method and device for a ubiquitous UE, wherein a UE middleware is embedded in a ubiquitous UE; the UE middleware performs data interaction with a U-node via a protocol layer for U-node network connectivity and a protocol layer for wide-area connectivity, determines a UE capability required by a service by analyzing a service request, determines required U-nodes in a peripheral network environment according to the UE capability required by the service, aggregates the required U-nodes into a virtual UE, integrates service data provided by the virtual UE, and presents the integrated data to a user via a service component. Thus, a ubiquitous UE in a ubiquitous network is allowed to acquire context information in time, and dynamical structural adjustment is performed on a virtual organization via aggregation and reconstruction of U-nodes in the peripheral network environment, achieving optimized resource utilization and adaptation to a dynamically changing environment, so as to provide the user with better services and optimal user experience.

DETAILED DESCRIPTION

According to embodiments of the disclosure, a UE middleware is embedded in a ubiquitous UE; the UE middleware performs data interaction with a U-node via a protocol layer for U-node network connectivity and a protocol layer for wide-area connectivity, determines a UE capability required by a service by analyzing a service request, determines required U-nodes in a peripheral network environment according to the UE capability required by the service, aggregates the required U-nodes into a virtual UE, integrates service data provided by the virtual UE, and presents the integrated data to a user via a service component.

the ubiquitous UE refers to a combined system in which a graded resource model is constructed for peripheral network equipments around the user in a ubiquitous network by dividing UE-peripheral (or PAN-peripheral) equipments into U-nodes and U-gadgets according to capabilities and characteristics in use, thereby forming a hierarchical structure in organization of ubiquitous equipments. Furthermore, a U-node refers to a UE behind a node of a network (such as a sensor network, a PAN, an office network, or a vehicle network) in a ubiquitous-network architecture; and a U-gadget refers to an equipment with a converging or processing function in a ubiquitous-network architecture, for example, a UE such as a gateway or a cluster head.

The disclosure is further elaborated with reference to specific embodiments and drawings.

Figure 1:
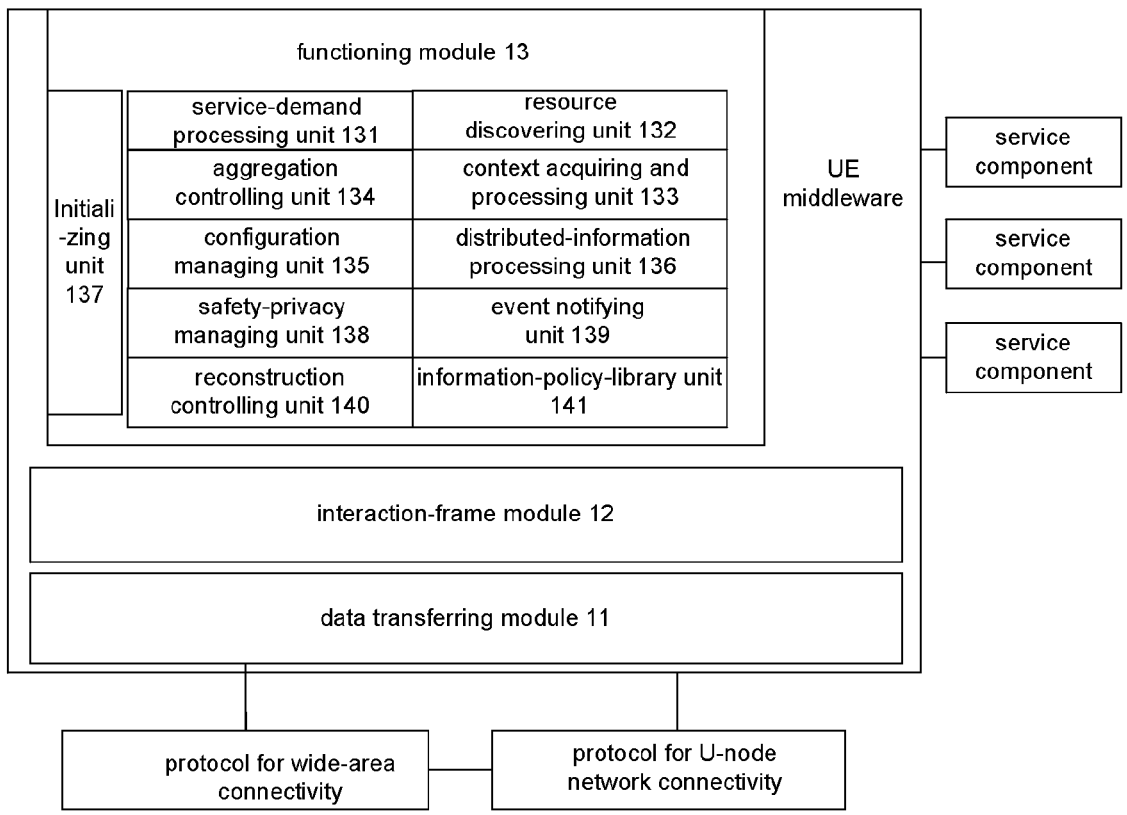
FIG. 1 is a schematic diagram of a structure of an service processing device for a ubiquitous UE.

The disclosure implements a service processing device for a ubiquitous UE. As shown in FIG. 1, the device is a UE middleware embedded in a ubiquitous UE, the UE middleware including a data transferring module 11 and a functioning module 13, wherein the data transferring module 11 is configured to perform data interaction with a U-node via a protocol layer for U-node network connectivity and a protocol layer for wide-area connectivity using a Transfer Control Protocol (TCP)/User Datagram Protocol (UDP);

the protocol layer for U-node network connectivity and the protocol layer for wide-area connectivity may encapsulate a network protocol of a wireless point-to-point (ad hoc) mode, such as 802.11 of an ad hoc mode (a, b, g), Bluethooth, Ad hoc On-Demand Distance Vector Routing (AODV), a Dynamic Source Routing (DSR) protocol, and the like, for data transmission between the functioning module 13 and a U-node, between a U-node and a U-gadget, between U-gadgets, or between other wide-area equipments; and the functioning module 13 is configured to: determine a UE capability required by a service by analyzing a service request; determine required U-nodes in a peripheral network environment according to the UE capability required by the service; aggregate the required U-nodes into a virtual UE; integrate service data provided by the virtual UE, and present the integrated data to a user via a service component.

The device may further includes an interaction-frame module 12 configured to mask different communication modes and messages of various U-nodes, and provide a capability to select from and convert between different communication-interaction models for data interaction between the functioning module and the U-node via the data transfer module, wherein a communication-interaction model defines the semantic effect of data exchange with a U-node, a service-resource related operation including Create, Read, Update, Delete, and the like, and defines specifications concerning data organization, control primitives, data representation, roles of interacting parties, and the like; the communication-interaction models include a Remote Procedure Call Protocol (RPC), (publish/subscribe), data spaces, blackboards, and the like.

The service component may include, but is not limited to: input and output equipments, such as keyboards, monitors, and the like.

the functioning module 13 may include a service-demand processing unit 131, a resource discovering unit 132, a context acquiring-and-processing unit 133, an aggregation controlling unit 134, a configuration managing unit 135, and a distributed-information processing unit 136, wherein the service-demand processing unit 131 is configured to analyze the service request to obtain user preference and context information corresponding to information on the service, send the user preference and context information to the context acquiring-and-processing unit 133, integrate merged service data, and send the integrated service data to the service component to present the integrated service data to the user;

the service request generally includes information on the requested service and information on the user;

the merged service data are integrated generally by combining data segments with the same service data header together to form the complete service data;

the context acquiring-and-processing unit 133 is configured to acquire the context information of a U-node in the peripheral network environment, determine the UE capability required by the service according to the user preference and context information acquired by the service-demand processing unit 131, and send the UE capability required by the service to the resource discovering unit 132;

the context acquiring-and-processing unit 133 is further configured to maintain a universal state simultaneously in a distributed environment, for example, coordinated states of an aggregated service on distributed U-nodes involved in the service aggregation, consistency in service transportation, and a persistent state;

the resource discovering unit 132 is configured to: when a ubiquitous UE containing the UE middleware does not have the UE capability required by the service, determine the required U-nodes in the peripheral network environment according to the UE capability required by the service and the context information of a U-node in the peripheral network environment, and notify the aggregation controlling unit 134 of the required U-nodes;

specifically, the resource discovering unit 132 manages UE capabilities provided by the ubiquitous UE containing the UE middleware and by a U-node in the peripheral network environment, and defines a specification concerning a capability discovering mechanism via a tool such as an Extensible Markup Language (XML); when the ubiquitous UE containing the UE middleware does not have the UE capability required by the service, the resource discovering unit 132 searches, according to the UE capability required by the service and the context information of a U-node in the peripheral network environment, the peripheral network environment for U-nodes with the UE capability required by the service, which U-nodes are distributed U-nodes and provide service data of distributed information; then, the resource discovering unit 132 notifies the aggregation controlling unit 134 of the found U-nodes;

the resource discovering unit 132 is further configured to: when the ubiquitous UE containing the UE middleware has the UE capability required by the service, directly notify the ubiquitous UE containing the UE middleware to provide the service data;

the aggregation controlling unit 134 is configured to aggregate the required U-nodes into the virtual UE;

specifically, the aggregation controlling unit 134 aggregates the required U-nodes into the virtual UE according to an aggregation policy, which aggregation policy may be for service aggregation with an optimal configuration, that is, for aggregating the required U-nodes into a service aggregator (as a unified virtual UE) for the optimal configuration; the condition for the optimal configuration includes for example the QoS, the user satisfaction, and the like;

the configuration managing unit 135 is configured to provide an interface required to configure the virtual UE for the user, such that the user may perform service configuration on the aggregated virtual UE according to his/her own preference;

the distributed-information processing unit 136 is configured to merge the service data provided by the virtual UE, and send the merged service data to the service-demand processing unit 131;

the distributed-information processing unit 136 is further configured to provide support for an execution environment for transportation of a service in execution between ubiquitous-UE nodes as well as management of a lifecycle of a transportable service; and obtain information such as a magnitude of a demand for service resources according to interaction with the virtual UE, determine whether the service is transported, copied, or dead according to information such as the magnitude of the demand for service resources, and thereby implement optimized distribution and organization of the service resources over U-nodes in the peripheral network environment.

Furthermore, the functioning module 13 further includes an initializing unit 137, a safety-privacy managing unit 138, an event notifying unit 139, a reconstruction controlling unit 140, and an information-policy-library unit 141, wherein the initializing unit 137 is configured to install and activate data exchanging and interacting functions of each unit;

the safety-privacy managing unit 138 is configured to: perform authentication for user access according to information on the user in the service request; when the user is authorized to access the requested service, send the service request to the service-demand processing unit 131; when the user is not authorized to access, or when the service requested by the access intrudes on the privacy of a manufacturer, turn down the service request, and return a service-request-fail message;

the event notifying unit 139 is configured to: when the state of a ubiquitous UE in the peripheral network environment changes, notify the context acquiring-and-processing unit 133 to update the context information of a U-node in the peripheral network environment;

the reconstruction controlling unit 140 is configured to reconstruct the aggregated virtual UE according to the context information of a U-node in the peripheral network environment updated by the context acquiring-and-processing unit 133;

the reconstruction may be done by information interaction with a U-node by IP or by a wireless-communication-module protocol;

specifically, the reconstruction controlling unit 140 incorporates a suitable replacing U-node and a reconfigured U-node into the aggregated virtual UE according to the updated context information of a U-node in the peripheral network environment to implement seamless service providing and adaptation to the environment;

the information-policy-library unit 141 is configured to provide data information such as aggregation policy information, and the user preference and context information corresponding to the information on the service.

Figure 2:
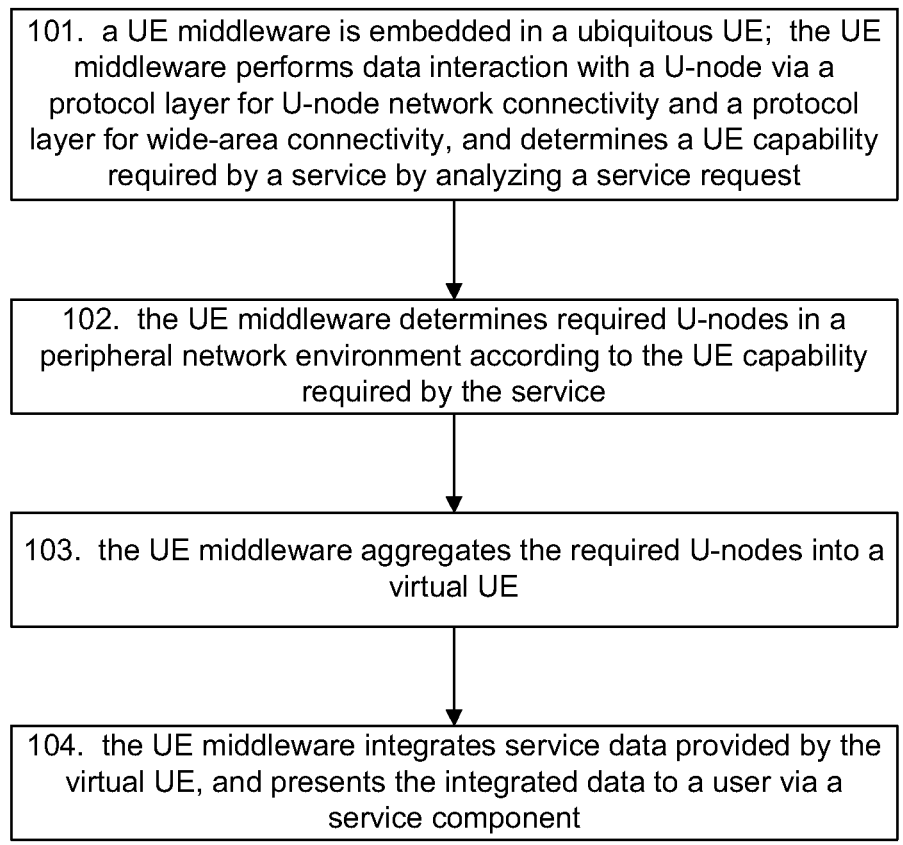
FIG. 2 is a flowchart of a service processing method for a ubiquitous UE.

Based on the aforementioned device, the disclosure further provides a service processing method for a ubiquitous UE. As shown in FIG. 2, the method includes steps as follows.

Step 101: a UE middleware is embedded in a ubiquitous UE; the UE middleware performs data interaction with a U-node via a protocol layer for U-node network connectivity and a protocol layer for wide-area connectivity, and determines a UE capability required by a service by analyzing a service request.

Specifically, the UE middleware is embedded in the ubiquitous UE, the UE middleware performs data interaction with the U-node via the protocol layer for U-node network connectivity and the protocol layer for wide-area connectivity using TCP/UDP; and the UE middleware is configured with a mechanism for masking different communication modes and messages of various U-nodes; when performing data interaction with the U-node, the UE middleware provides a capability to select from and convert between different communication-interaction models; when receiving the service request, the UE middleware analyzes the service request to obtain user preference and context information corresponding to information on the service, acquires the context information of a U-node in the peripheral network environment, and determines a UE capability required by a service according to the user preference and context information corresponding to the information on the service, wherein the service request is for example a downloading request and the like.

In this step, when receiving the service request, the UE middleware performs authentication for user access according to information on the user in the service request; when the user is authorized, allows the user to access the requested service; when the user is not authorized, or when the service requested by the access intrudes on the privacy of a manufacturer, turns down the service request, and returns a service-request-fail message.

This step further includes that: when the state of a ubiquitous UE in the peripheral network environment changes, the UE middleware updates the context information of a U-node in the peripheral network environment.

Step 102: the UE middleware determines required U-nodes in a peripheral network environment according to the UE capability required by the service.

Specifically, when the ubiquitous UE containing the UE middleware does not have the UE capability required by the service (for example, according to a downloading request, the ubiquitous UE containing the UE middleware does not have any service downloading capability), the UE middleware determines the required U-nodes in the peripheral network environment according to the UE capability required by the service and the context information of a U-node in the peripheral network environment.

This step further includes that: when the ubiquitous UE containing the UE middleware has the UE capability required by the service, the UE middleware directly notifies the ubiquitous UE containing the UE middleware to provide the service data.

Step 103: the UE middleware aggregates the required U-nodes into a virtual UE.

Specifically, the UE middleware aggregates the required U-nodes into the virtual UE according to an aggregation policy, which aggregation policy may be for service aggregation with an optimal configuration, that is, for aggregating the required U-nodes into a service aggregator (as a virtual UE) for the optimal configuration; the condition for the optimal configuration includes for example the QoS, the user satisfaction, and the like.

Step 104: the UE middleware integrates service data provided by the virtual UE, and presents the integrated data to a user via a service component.

Specifically, the UE middleware merges the service data provided by the virtual UE, integrates merged service data, and sends the integrated service data to the service component to present the integrated service data to the user.

The merged service data are integrated generally by combining data segments with the same service data header together to form the complete service data.

The method further includes that: when the state of a ubiquitous UE in the peripheral network environment changes, the UE middleware reconstructs the aggregated virtual UE according to updated context information of a U-node in the peripheral network environment.

With the solution, a ubiquitous UE in a ubiquitous network is allowed to acquire context information in time, and dynamical structural adjustment is performed on a virtual organization via aggregation and reconstruction of U-nodes in the peripheral network environment, achieving optimized resource utilization and adaptation to a dynamically changing environment, so as to provide the user with better services and optimal user experience.

What describe are merely preferred embodiments of the disclosure and are not intended to limit the scope of the disclosure.

The invention claimed is:

1. A User Equipment (UE) for constructing a graded resource model for peripheral network equipments around a user in a ubiquitous (U-) network by dividing UE-peripheral equipments into U-nodes and U-gadgets according to capabilities and characteristics in use to form a hierarchical structure in organization of ubiquitous equipments, the UE comprising a data transferring module and a functioning module, wherein the data transferring module is configured to perform data interaction with a ubiquitous node (U-node) via a protocol layer for U-node network connectivity and a protocol layer for wide-area connectivity using a Transfer Control Protocol (TCP)/User Datagram Protocol (UDP), and to receive a service request of the user comprising information on a requested service and information on the user; and the functioning module is configured to: determine a UE capability required by the service by analyzing the service request; determine required U-nodes in a peripheral network environment according to the UE capability required by the service;

aggregate the required U-nodes into a virtual UE; integrate service data provided by the virtual UE, and present the integrated data to the user via a service component comprising input and output equipments.

2. The UE according to claim 1, further comprising an interaction-frame module configured to mask different communication modes and messages of various U-nodes, and provide a capability to select from and convert between different communication-interaction models for data interaction between the functioning module and a U-node via the data transfer module.

3. The UE according to claim 2, wherein the functioning module comprises a service-demand processing unit, a resource discovering unit, a context acquiring-and-processing unit, an aggregation controlling unit, a configuration managing unit, and a distributed-information processing unit, wherein the service-demand processing unit is configured to: analyze the service request to obtain user preference and context information corresponding to the information on the service, send the user preference and context information to the context acquiring-and-processing unit, integrate merged service data, and send the integrated service data to the service component to present the integrated service data to the user;

the context acquiring-and-processing unit is configured to acquire the context information of a U-node in the peripheral network environment, determine the UE capability required by the service according to the user preference and context information acquired by the service-demand processing unit, and send the UE capability required by the service to the resource discovering unit;

the resource discovering unit is configured to: when the UE does not have the UE capability required by the service, determine the required U-nodes in the peripheral network environment according to the UE capability required by the service and the context information of a U-node in the peripheral network environment, and notify the aggregation controlling unit of the required U-nodes;

the aggregation controlling unit is configured to aggregate the required U-nodes into the virtual UE;

the configuration managing unit is configured to provide an interface required to configure the virtual UE for the user; and the distributed-information processing unit is configured to merge the service data provided by the virtual UE, and send the merged service data to the service-demand processing unit.

4. The UE according to claim 3, wherein the aggregation controlling unit is configured to aggregate the required U-nodes into the virtual UE according to an aggregation policy for service aggregation with an optimal configuration.

5. The UE according to claim 3, wherein the resource discovering unit is configured to: when the UE has the UE capability required by the service, directly notify the UE to provide the service data.

6. The UE according to claim 3, wherein the functioning module further comprises an initializing unit, a safety-privacy managing unit, an event notifying unit, a reconstruction controlling unit, and an information-policy-library unit, wherein the initializing unit is configured to install and activate data exchanging and interacting functions of each unit;

the safety-privacy managing unit is configured to: perform authentication for user access according to the information on the user in the service request, and when the user is authorized to access the requested service, send the service request to the service-demand processing unit;

the event notifying unit is configured to: when the state of a ubiquitous UE in the peripheral network environment changes, notify the context acquiring-and-processing unit to update the context information of a U-node in the peripheral network environment;

the reconstruction controlling unit is configured to reconstruct the aggregated virtual UE according to the context information of a U-node in the peripheral network environment updated by the context acquiring-and-processing unit; and the information-policy-library unit is configured to provide aggregation policy information and the user preference and context information corresponding to the information on the service.

7. The UE according to claim 6, wherein the reconstruction controlling unit is configured to incorporate a suitable replacing U-node and a reconfigured U-node into the aggregated virtual UE according to the updated context information of a U-node in the peripheral network environment to implement seamless service providing and adaptation to the environment.

8. A service processing method for a User Equipment (UE) for constructing a graded resource model for peripheral network equipments around a user in a ubiquitous (U-) network by dividing UE-peripheral equipments into U-nodes and U-gadgets according to capabilities and characteristics in use to form a hierarchical structure in organization of ubiquitous equipments, the method comprising:

performing, by the UE, data interaction with a ubiquitous node (U-node) via a protocol layer for U-node network connectivity and a protocol layer for wide-area connectivity using a Transfer Control Protocol (TCP)/User Datagram Protocol (UDP), and receiving a service request of the user comprising information on a requested service and information on the user;

determining, by the UE, a UE capability required by the service by analyzing the service request; determining required U-nodes in a peripheral network environment according to the UE capability required by the service; and aggregating the required U-nodes into a virtual UE; and integrating, by the UE, service data provided by the virtual UE, and presenting the integrated data to the user via a service component comprising input and output equipments.

9. The method according to claim 8, further comprising:
when the UE receives the service request, performing, by the UE, authentication for user access according to the information on the user in the service request, and when the user is authorized, allowing the user to access the requested service.

10. The method according to claim 8, further comprising:
when the state of a ubiquitous UE in the peripheral network environment changes, reconstructing, by the UE, the aggregated virtual UE according to updated context information of a U-node in the peripheral network environment.

* * * * *